O. T. GREGORY & N. W. CARKHUFF.
PHOTOGRAPHIC CAMERA.
APPLICATION FILED APR. 15, 1910.

1,167,356.

Patented Jan. 4, 1916.
3 SHEETS—SHEET 1.

WITNESSES:

INVENTORS
Oscar T. Gregory
Norman W. Carkhuff
BY
their ATTORNEYS.

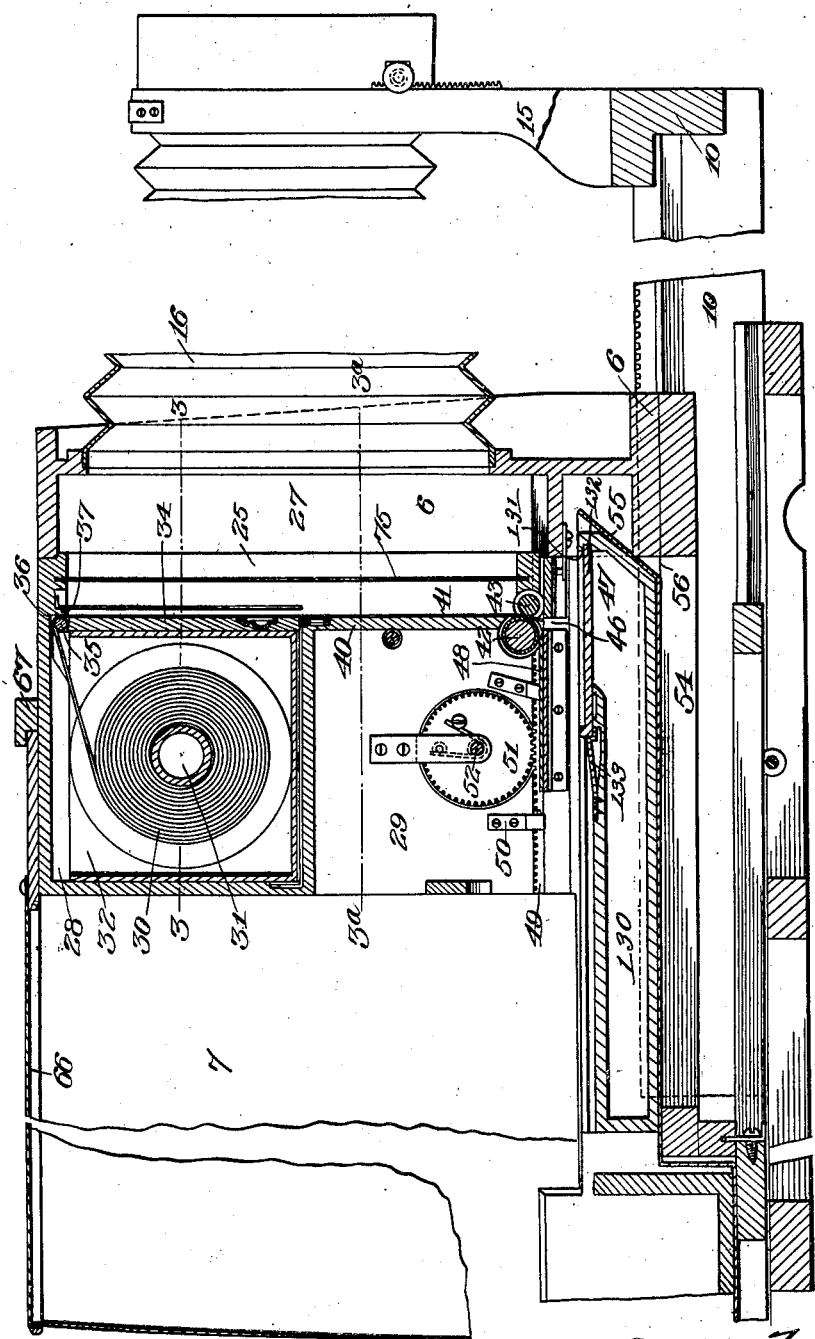

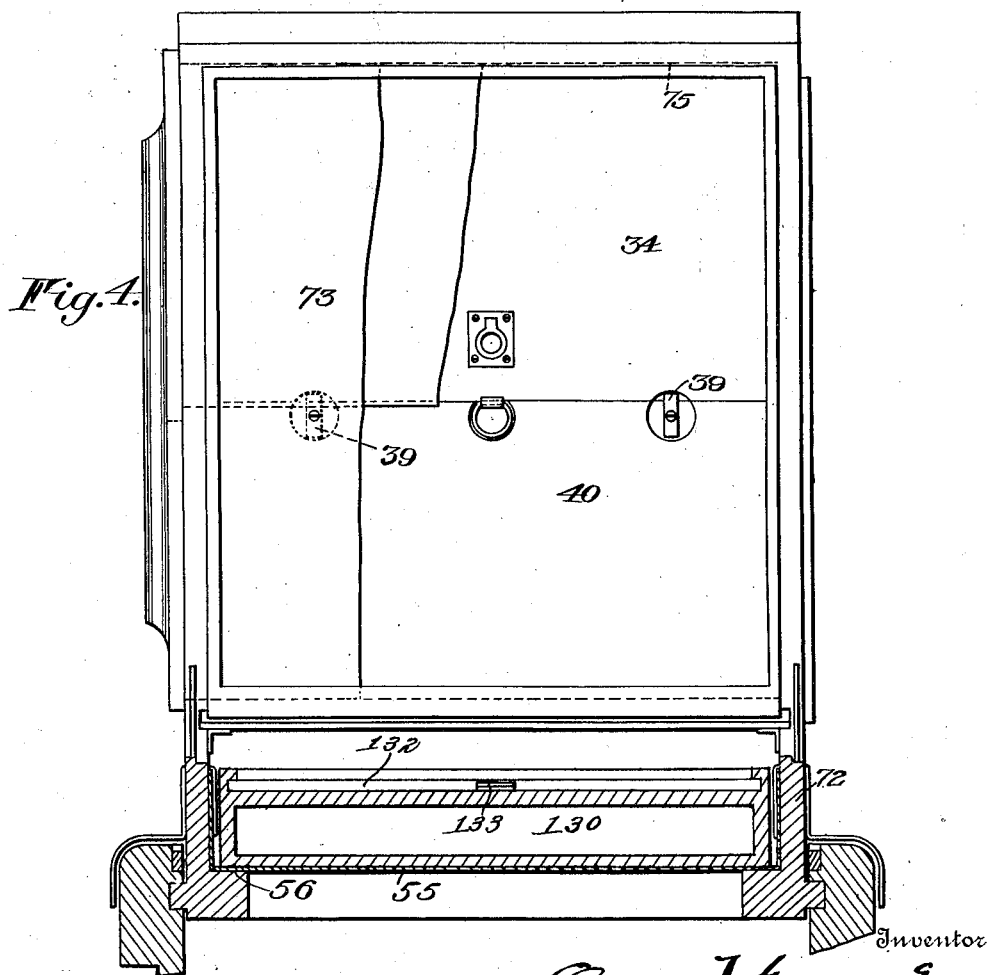

UNITED STATES PATENT OFFICE.

OSCAR T. GREGORY AND NORMAN W. CARKHUFF, OF ROCHESTER, NEW YORK, ASSIGNORS, BY MESNE ASSIGNMENTS, TO COMMERCIAL CAMERA CO., OF PROVIDENCE, RHODE ISLAND, A CORPORATION OF RHODE ISLAND.

PHOTOGRAPHIC CAMERA.

1,167,356.     Specification of Letters Patent.     Patented Jan. 4, 1916.

Application filed April 15, 1910. Serial No. 555,709.

*To all whom it may concern:*

Be it known that we, OSCAR T. GREGORY and NORMAN W. CARKHUFF, both of Rochester, in the county of Monroe and State of New York, have invented certain new and useful Improvements in Photographic Cameras; and we do hereby declare the following to be a full, clear, and exact description of the same, reference being had to the accompanying drawings, forming a part of this specification, and to the reference-numerals marked thereon.

The present invention relates to photography and it has for its object to provide a photographic apparatus of relatively simple construction by means of which photographs, particularly of relatively small objects of different sizes capable of being handled and arranged, may be taken in rapid succession and developed and fixed, or otherwise prepared, for permanent exposure to the light without delay of any kind and with ease and convenience.

A further object is to provide a camera of the type known as "copying cameras" that will be simple and convenient in construction and use, and be adapted to feed, expose, cut and deliver, for development or storage, and in an improved manner, a continuous strip of sensitized paper.

Our improvements are further directed toward general features of camera construction and toward producing an apparatus of the character described that may be successfully operated by persons not particularly skilled in the photographic art.

To these and other ends the invention consists in certain improvements and combinations of parts all as will be hereinafter more fully described, the novel features being pointed out in the claims at the end of the specification.

Figure 1:
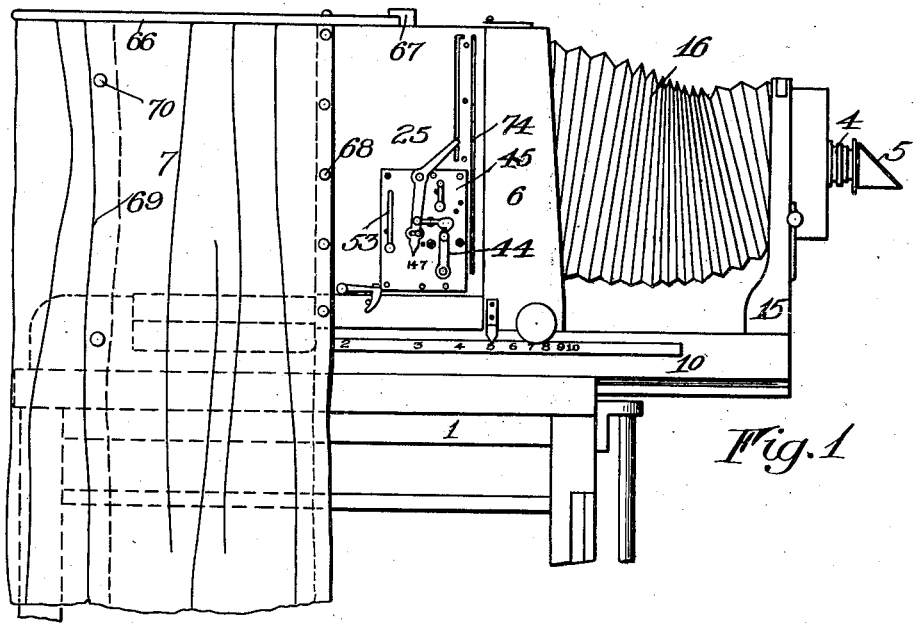
Figure 3:
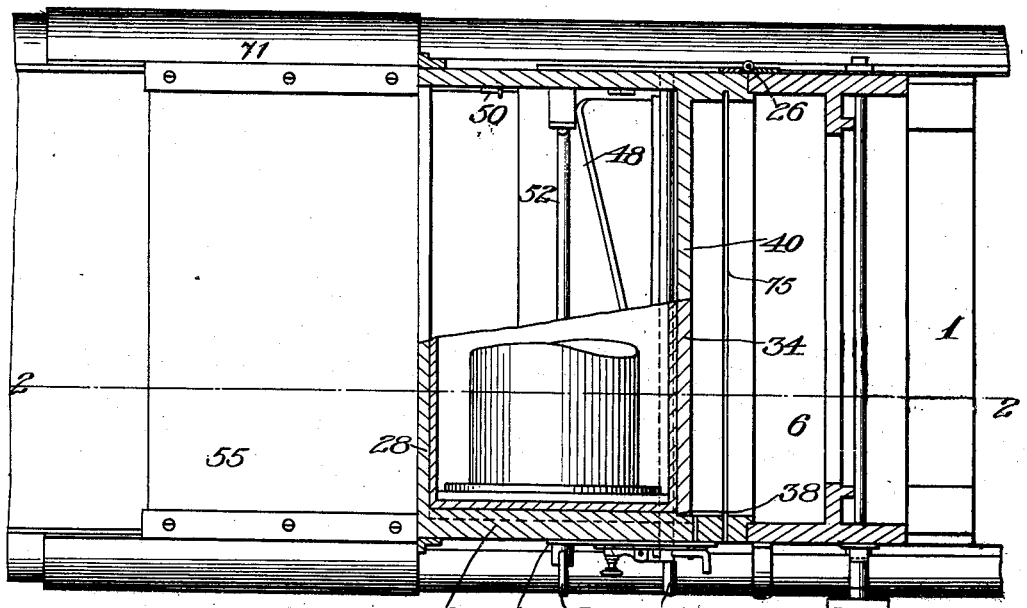

In the drawings: Figure 1 is a side elevation of a photographic apparatus constructed in accordance with and illustrating one embodiment of our invention; Fig. 2 is a longitudinal central section through the camera proper and adjacent parts, the section being taken on the line 2—2 of Fig. 3; Fig. 3 is a fragmentary top plan view of the apparatus, partly in section, the sections being taken approximately on the lines 3—3 and 3ª—3ª of Fig. 2; Fig. 4 is a front elevation of the camera back, the adjacent portion of the bed frame being shown in transverse section.

Similar reference numerals throughout the figures indicate the same parts.

Referring first to the general features of construction and operation the device comprises a suitable standard or support 1, preferably in the nature of a table. Movable horizontally on top of the support is a camera having a lens tube 4 fitted with an angularly arranged mirror 5 that directs the rays vertically as they pass between the object arranged in front of and below the camera and the lens. The lens itself is not shown, a tube of this character being well known in the art. Means are provided for focusing the camera on the object according to its position with respect to its distance from the lens and the latter, of course, determines the size of the image as it appears in the focal plane of the camera, while the movement of the latter bodily permits the lens, through the medium of the mirror, to be centered upon any desired portion of the object.

In the lower part of the camera body 6 is a chamber into which the exposed print or negative is automatically fed and severed from a continuous roll of sensitized material and it is preferably caught in a developing pan or storage container from which it is subsequently transferred. The receiving element which would otherwise be exposed, is protected by a light excluding hood 7 that hangs in rear of the camera. The operator can reach beneath this hood to manipulate the negatives by hand and withdraws the finished photograph or the storage receptacle containing the exposed sheets from beneath the same.

The apparatus herein illustrated was particularly designed for commercial photography, being of great utility in obtaining photographic copies of written documents, records, etc., which can be rapidly done at small expense in less time than it would take to copy this work in any other way and with absolute accuracy.

Having given a general idea of the main features of the apparatus, its purposes and functions we will now describe in detail the particular embodiment of the invention illustrated in the drawings.

The camera front 15 is preferably rigidly secured at the forward end of a frame 10 on a supporting table 1, but the body portion 6, with which the front is connected by the usual bellows 16, is adjustable on the bed frame by means not requiring description here, the camera in the present instance being of a rear focus type.

The sensitized material is, in the present instance, carried by a back 25 (Fig. 2) having a separable relationship to the body 6 and preferably hinged thereto at 26 (Fig. 3) to swing laterally so that its front side is moved into and out of coöperation with the rear of the body 6 to form the exposure chamber 27. This back is divided into upper and lower chambers 28 and 29, respectively, the upper one being the storage chamber for the sensitized material 30 which is, in the present instance, wound in a roll on the core of a spool 31, the end flanges 32 fitting snugly within the ends of a box 33 that can be slid into the chamber 28 in the manner of a drawer and similarly withdrawn therefrom through the open front side. This side is sealed after the roll has been put in place by a separable and in the present instance detachable door or closure 34 (Figs. 2 and 4) forming a front wall and carrying a roller 35 at its upper edge that is spaced from the top wall of the casing of the back to constitute an exit opening 36 for the strip of sensitized material 30. The said casing is provided with an upper shoulder 37 behind which the roller engages to prevent the closure from falling outward at the top, while shoulders 38 (Fig. 3) on the lateral walls of the chamber 28 prevent the closure from being moved too far inward. Its lower edge is engaged and secured by any suitable means, such as the buttons 39, carried on the front wall 40 of the lower chamber 29, after the closure has been put in place by an upward movement in which it is engaged behind the shoulder 37, the latter serving to prevent the entrance of light through the exit opening 36 into the chamber 28.

The front walls 34 and 40 of the two chambers 28 and 29 lie in the same plane and conjointly form a backing against which that portion of the strip of sensitized material that is stretched in the focal plane is held in a flat position for exposure, the roller 35 being for this purpose arranged so that the surface of the walls is tangent thereto. The strip is led from the roll through the exit opening 36 and down across the said walls, as at 41, to a point at the lower part of the exposure chamber 27 where it is gripped between a feed roller 42 and a tension roller 43 journaled in the back 25 and also arranged tangentially to the face of the walls. The roller 42 is operated to feed the strip by means of an exteriorly arranged crank 44 (Fig. 1) which under the restriction of controlling devices mounted on a plate 45 (but which form no part of the present invention) passes the portion 41 of the strip after exposure through a passage 46 in the bottom of the back into a storage chamber 47 in the lower part of the camera body 6 and stretches a fresh expanse 41 in the focal plane of the camera. After the exposed portion has passed into the chamber 47 a reciprocating knife 48, operating beneath the rollers, severs it. This knife 48 is in the present instance supported on rack bars 49 held in suitable guides at either side of the back 25 within the lower chamber 29 by plates 50 and meshing with the rack bars are gears 51 mounted on a shaft 52 journaled in the back to extend through said chamber and turned by an exteriorly arranged crank 53 through which means the reciprocation of the knife is effected.

The body 6 of the camera is extended rearwardly at the bottom by the addition of a frame-like extension 54 to form the chamber 47 preferably fitted, when the camera is provided with developing equipment with a lining 55 of sheet metal or other suitable liquid-tight material which rests upon shoulders 56 on the frame 54. Within the chamber 47 may be arranged a pan or receptacle having a normal position beneath the passage 46 and containing the developing bath into which is received the exposed portion of the strip as it is fed from the roller 42, but in the present instance I have shown a device designed to avoid the necessity for the immediate development of the negative and preserve a number of them for this treatment at a later time and at a place distant from the locality where the machine is operated. This consists of a receptacle 130, shown in section in Fig. 2, in the chamber 47 provided with an opening 131 that registers approximately with the opening 46 from the interior of the back 25 when the receptacle is inserted in the said chamber. This opening is closed by a sliding cover or shutter 132, secured by a spring catch 133 so that after one or more prints have been deposited therein in the course of the operation of the machine the opening 131 may be sealed and the exposures removed in the receptacle in a dry or undeveloped state. The hood 7 is, in the present instance, hung from a frame 66 having its inner end retained beneath a cleat 67 on the top wall of the back and the side portions are caused to form a tight joint with the back, as by the snap buttons 68. The hood is, of course, flexible and, if desired, may be split at 69 and the parts held by snap buttons 70 to constitute another point of entrance when unobstructed access to the pans is desired.

It will be observed that the roll of sensitized material, the backing upon which it is exposed, the feed rollers and the hood 7 are all carried on the hinged back 25 above the chamber 47 in the lower part of the body 6 and can be swung laterally therewith so that the chamber 47 and its contents are entirely exposed. In case it is wished to effect this manipulation of the parts while a portion 41 of the sensitized strip is in position for exposure we provide a shutter device 73 (shown broken away in Fig. 4) which is entered through an opening 74 in a side wall of the casing of the back and slides in slots 75 in the interior thereof to completely seal the open front of the back just in rear of the plane of its coöperation with the body 6. Thus the pans are rendered completely accessible at any time without disturbing the adjustment of the sensitized material.

The swinging back, arranged as described, renders the loading of the camera exceedingly convenient, as, upon separating the back and body, the roll holding drawer or box can be readily inserted and the end of the strip easily fed between the rollers 42 and 43 as its exit from the chamber 28 for disposal in the focal plane is from the same side of the chamber at which the roll is introduced and practically through the same opening, though greatly restricted.

What we claim is:

1. In a camera, the combination with a body portion, of a chamber for the exposed sheets in the lower part thereof, a back having a separable relation to the body and a normal position above the chamber, a holder for the sensitized material carried by the back and means for feeding the sensitized material, after exposure, from the back to the chamber.

2. In a camera, the combination with a body portion, and a back having a separable relation but normally coöperating to form an exposure chamber, of a chamber for the exposed sheets in the lower part of the body and below the back when the back and body are in coöperative position, a holder for the sensitized material carried by the back, means for feeding said material after exposure from the back to the chamber, and a shutter for sealing the back when separated from the body and moved from above the chamber.

3. In a camera, the combination with a body portion, of a chamber for the exposed sheets in the lower part thereof, a back having a normal position above the chamber in coöperation with the body, and hinged to the latter to swing to a lateral position, a holder for the sensitized material carried by the back and means for feeding the sensitized material, after exposure, from the back to the chamber.

4. In a camera, the combination with a body portion, of a chamber for the exposed sheets in the lower part thereof, a movable back having a separable relation to the body and a normal position above a portion of the chamber, a holder for the sensitized material carried by the back, means for feeding an exposed sheet from the back to the chamber, and a flexible light excluding hood carried by the back to overhang the other portion of the chamber and movable with the back to expose the same.

5. In a camera, the combination with an exposure chamber, a storage chamber communicating therewith by a connecting passage and means for transferring an exposed sheet from the former to the latter, of a removable light tight receptacle adapted to occupy the storage chamber and provided with an opening registering with the communicating passage between the chambers, and a shutter device for closing said opening prior to the removal of the receptacle.

6. In a camera, the combination with a body portion, of a separable back coöperating therewith and embodying a chamber for the sensitized material, said chamber being accessible from that side of the back which coöperates with the body, a feeding device for the sensitized material carried by the back and a chamber for the exposed sheets arranged in the lower part of the body and adapted to be uncovered upon the separation of the back and body.

7. In a camera, the combination with a body, of a back hinged at one side to the body and coöperating therewith to form an exposure chamber, said back embodying a chamber for the sensitized material accessible only upon the separation of the back and body, a feeding device for the sensitized material carried by the back and a chamber for the exposed sheets arranged in the lower part of the body and adapted to be uncovered when the back is swung on its hinges away from the body.

8. In a camera, the combination with a body and a separable back coöperating therewith and comprising a chamber for the sensitized material, of a drawer operating in the chamber and removable therefrom from the side of the back which coöperates with the body.

9. In a camera, the combination with a casing having a roll holding chamber therein, opening at the front for the insertion of the roll, of a separable and replaceable light tight closure for said chamber arranged, when in position, to serve as a backing support for that portion of a strip of sensitized material which is stretched in the focal plane of the camera.

OSCAR T. GREGORY.
NORMAN W. CARKHUFF.

Witnesses:
RUSSELL B. GRIFFITH,
LUCY A. VAN COURT.